United States Patent [19]

Grandclement

[11] Patent Number: 4,684,417

[45] Date of Patent: Aug. 4, 1987

[54] PROCESS FOR THE CONTROL OF THE WELDING TIME OF AN ELECTRICAL WELDED UNION

[75] Inventor: Gérard Grandclement, Cap D'Ail, France

[73] Assignee: Societte Anonyme Nomegasgne Toutlectric

[21] Appl. No.: 911,401

[22] Filed: Sep. 25, 1986

Related U.S. Application Data

[63] Continuation-in-part of Ser. No. 677,194, Dec. 3, 1984, abandoned.

[30] Foreign Application Priority Data

Dec. 2, 1983 [MC] Monaco .................... PV1677

[51] Int. Cl.[4] ............................. B32B 31/26
[52] U.S. Cl. ........................ 156/64; 138/104; 138/155; 156/158; 156/294; 156/304.2; 156/304.6; 219/494; 219/535; 250/577; 285/93; 285/286; 285/292
[58] Field of Search ............... 219/324, 494, 507, 535, 219/544; 138/104, 155; 156/64, 158, 294, 304.2, 304.3, 304.6, 359, 360; 250/357.1, 368, 577; 285/43, 286, 292; 425/147

[56] References Cited

U.S. PATENT DOCUMENTS

| 4,155,013 | 5/1979 | Spiteri | 250/357.1 X |
|---|---|---|---|
| 4,224,505 | 9/1980 | Sturm | 219/544 |
| 4,288,271 | 9/1981 | Campbell et al. | 156/359 |
| 4,486,650 | 12/1984 | Bridgstock et al. | 219/544 |
| 4,602,148 | 7/1986 | Ramsey | 219/535 |

*Primary Examiner*—Robert A. Dawson
*Attorney, Agent, or Firm*—Robert E. Burns; Emmanuel J. Lobato

[57] ABSTRACT

Two tubes of thermo-plastic material are joined by a sleeve in an inner portion of which there is an electrical resistance coil, the ends of which are connected to terminals projecting from the outer surface of the sleeve. An electrical circuit supplies electric current to the coil to heat an inner weld zone to welding temperature, while leaving enveloping outer portions at lower temperature. In the sleeve there is provided a radial hole or recess into which the heated material expands upon reaching welding temperature. The material expanding into the hole or recess when welding temperature is reached is sensed by a pressure responsive micro-switch or electro-optically by an optical transmitter and receiver and through a control circuit, shuts off the power to the resistance coil. The parts being thereby fused together, are allowed to cool to complete the weld.

5 Claims, 6 Drawing Figures

PROCESS FOR THE CONTROL OF THE WELDING TIME OF AN ELECTRICAL WELDED UNION

REFERENCE TO RELATED APPLICATION

This application is a continuation-in-part of application Ser. No. 677,194 filed Dec. 3, 1984 and now abandoned.

FIELD OF INVENTION

The present invention concerns the realization of electric welded unions for tubes or other members of thermoplastic material. It more specifically is directed to a procedure and a device for assuring optimum welding time with respect to the tube diameters.

By "union" one means here, a sleeve serving as a connector for prolonging the tubes at their extremities, as well as a connector whose purpose is to adapt another tube to a takeoff in the transverse sense, or to any other arrangement within which a certain number of tubular elements are associated.

For the clarity of the expose hereafter, reference will be made to the particular case of a sleeve as defined above, understanding that it is only an example for illustrating the procedure in accordance with background of the invention.

BACKGROUND OF THE INVENTION

It is understood that to unite two tubes of thermoplastic material, a sleeve of the same material is used in which the two end portions of the two tubes are inserted, that is to say the sleeve serves as a union, and in the internal superficial zone thereof there is imbedded a coil where the extremities are excited by an electrical current. When this source is electrified, the current flowing in the coil causes the fusion of the material in the internal superficial zones of the tube and the sleeve within which the tube is lodged. The two zones are subjected to a thermal dilation great enough so that the surfaces in fusion come into solid contact which assures their welding, when cooled, to form a solid block.

This simple process has a control difficulty however, since it is not visible from the exterior, but on the contrary, constitutes a progressive phenomenon, where the objective is the formation of a solid block between the tubes and their sleeve union, although this phenomenon can be surveyed by two physical indicies, the temperature and the volume.

Effectively, when the electrical current welding source is connected, the flow of current in the coil determines a sequence of events:

the turns of the coil being imbedded in the sleeve material, the heat developed by the flow of the current provokes the heating of the material in the surrounding zone, more and more approaching fusion and dilation up to its surface until it comes into contact with the tube exterior, onto which it exercises an increasing pressure;

next, the material of the tube enters into fusion thus insuring the welding under pressure of the tube with the sleeve.

if the current is not cut-off at this point, the dilation of the material in fusion will cause an increase in pressure in the welding zone, because the lateral zones on each side of the coil stay cold to avoid material loss and to assure the establishment of welding pressure.

SUMMARY OF THE INVENTION

The invention is directed to the problem of controlling the temperature or the volume of the material so that the shut-off of the flow of current can be effected at the moment when one or the other of the indices has attained a determined value, thus being certain that a proper weld is realized. The optimal flow of current time is a function of the sleeve diameter while the voltage is supposed to be constant.

Therefore an automatic control method is needed to insure the welding time of these unions and the present invention provides for this.

According to the invention, the flow of current is automatically cut-off when the properties of the material of the union of the tubes correspond to the optimal weld. To this effect, according to a first method of realization of the invention, it is the material of the fusion itself which, on dilating thermally, comes into contact with an electro-mechanic or electronic component which effects a shut-off the flow of current.

According to a second method of realization of the invention, it is the temperature that is selected as the variable, and which, when it attains a value corresponding to a softened or fusioned point desired determined the signalling by a thermal sensor of the information to shut-off the flow of current either by cutting-off the source of current or accomplishing the shutoff by the fusion of a heat sensible zone of the coil.

According to a third method of realization, it is an element sensible to the hardness or the consistence of the material that, on penetrating into the softened material controlled by functioning of an electro-mechanic or electronic component.

Other methods of realizatin can be imagined, in remaining within the framework of the invention, of sensing the utilizing a property relative to the softening of the material transmitted to a welding current shut-off system.

In the first place, the invention determines a process to control the welding time of an electrical welded sleeve and this process consists of utilizing the variations of the properties of the plastic material in fusion to react, at the moment when one of these properties attains its optimum point, by an electro-mechanic or electronic component to stop the flow of current.

In the practical realization of the first method of realization of the invention, the flowing of the material in fusion through a radial hole in the wall of the sleeve will be used. At the moment of welding, the material in fusion coming from the inner zone of the sleeve is led into this hole and comes into contact with the external surface of the sleeve. This well known phenomenon was exploited by attempting to control the operation visually by placing a "cork" in the hole, but such a system is too rudimentary to be a truly serious control. According to the invention, a micro-contact is placed in the orifice which is the hole, in a manner so that it is actuated by the material in fusion at the moment when it comes into contact, thus becoming a truly effective control.

The invention considers also a device to control the welding time of an electrically welded sleeve of the type in which the hole is drilled radially in the wall of the sleeve next to the coil so that the material in fusion flowing through this hole to the outer surface of the sleeve and contacting an electro-magnetic or electronic device placed next to the hole and serving to cut-off the current when it is touched by the material in fusion.

In a further embodiment of the invention the material in fusion flowing into a radial hole in the wall of the sleeve is sensed electro-optically by an optical transmitting element and an optical receiving element positioned to detect flow of the fusion material into the radial hole.

Naturally, the hole diameter must be chosen with respect to the size of the sleeve in a manner so that the quantity of the material in fusion which flows up is such that it contacts the control element at the exact moment when the welding is at the optimum and then stops the flow of current.

BRIEF DESCRIPTION OF DRAWINGS

The nature, objects and advantages of the invention will be more fully understood from the following description of preferred embodiments shown by way of example in the accompanying drawings in which.

DESCRIPTION OF PREFERRED EMBODIMENTS

Figure 1:
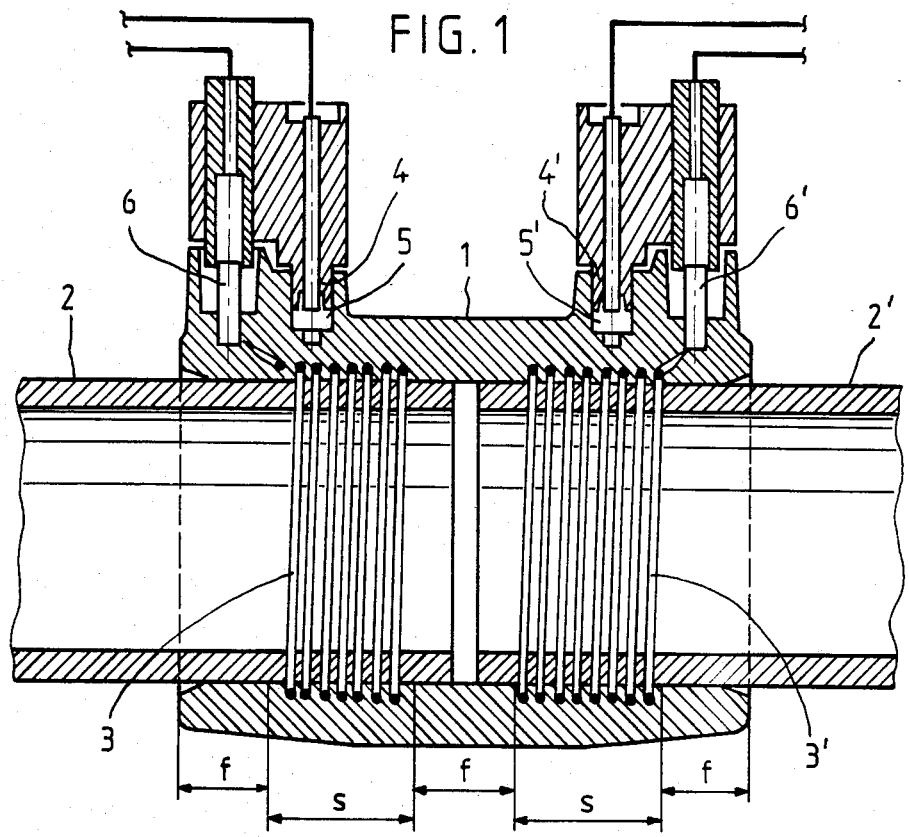
FIG. 1 illustrates the application of the invention for the connection of two coaxial tubes with a sleeve.

If one refers to FIG. 1 firstly, one sees represented a sleeve 1 of thermoplastic material, polyethylene for example, and two tubes or pipes 2—2' of the same material and of an external diameter slightly inferior to the internal diameter of the sleeve 1. The two tubes 2—2' are inserted in the sleeve 1 in a generally symmetrical manner so that their extremities are situated opposite the zones of the sleeve where resistance coils are imbedded in an inner portion of the sleeve and are connected to terminals 6—6' for connection to an electrical circuit as shown in FIG. 3.

Figure 3:
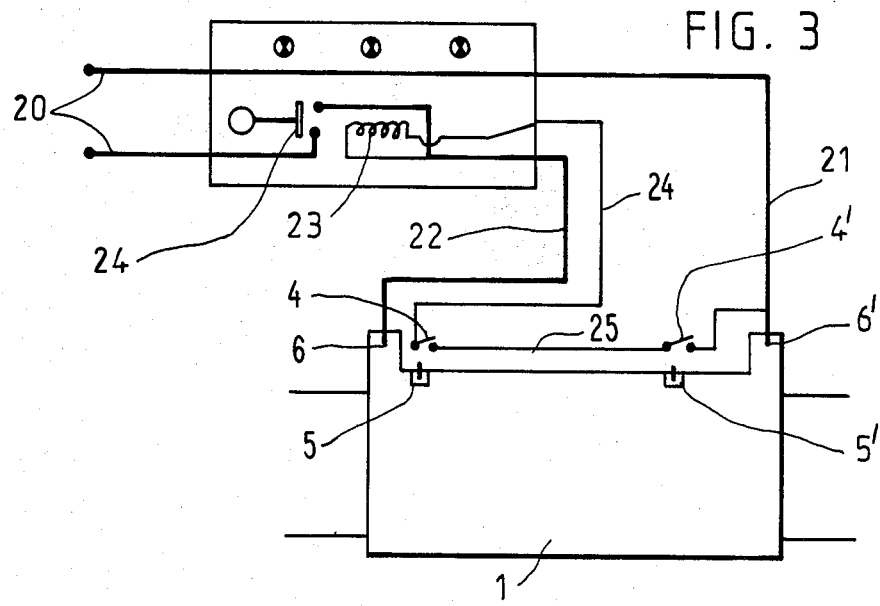
FIG. 3 illustrates schematically the control of the welding circuit for the realization of the process.

According to the invention, the power circuit of the two coils 3—3', once closed by the operator, as shown in FIG. 3, is automatically cut-out when the welding is completed, thanks to a control circuit commanded by two micro-contacts shown at 4—4' located in the depressions 5—5' next to the terminals 6—6' and bored in the wall of sleeve 1 next to the coils 3—3'.

When the process of fusion-dilation described above is in process, the material in fusion of the sleeve, under the effect of the dilating pressure, penetrates the bottom of each depression 5—5', and following this dilation, mounts in the depression until it exerts a pressure on each micro-switch 4—4' which cut-out the operating current to the coils and stops the welding operation.

Figure 2:
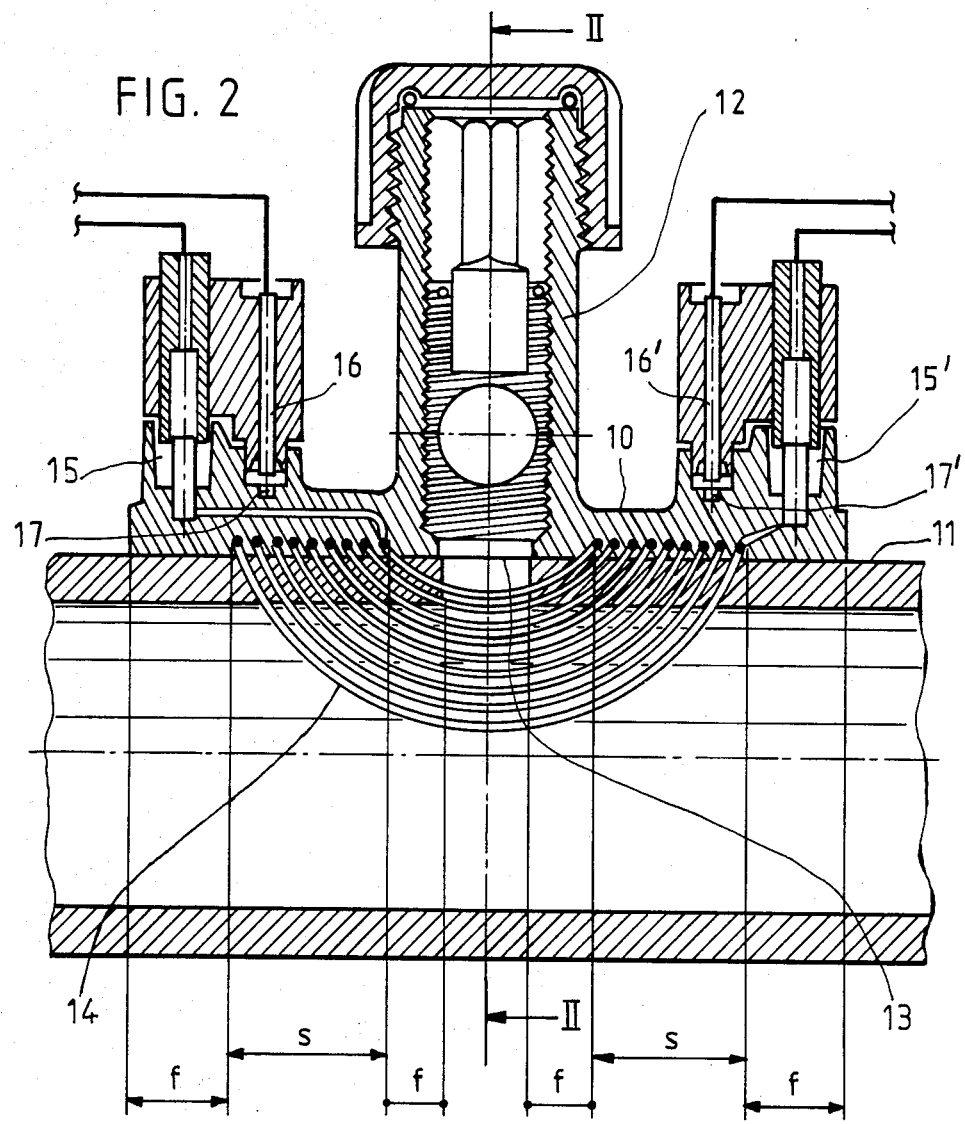
FIG. 2 illustrates the application of the invention for connecting a branch tube to a principal conduit.
Figure 2A:
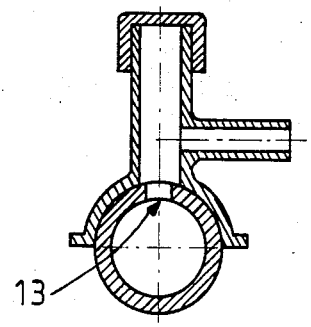
FIG. 2a illustrates a cut away view II—II of FIG. 2.

The process is the same in the application shown in FIGS. 2 and 2a in which, instead of a sleeve union of two coaxial tubes, the welding is accomplished with a saddle 10 covering all or part of a tube 11. For this action, the saddle 10 has a tube 12 threaded on the inside to permit, thanks to a threaded awl (not shown), the piercing of a hole 13 in the wall of tube 11 opposite the tube 12.

The saddle 10 has a coil 14, curved to adapt to the bent form of the saddle, and is powered by a circuit as shown in FIG. 3 connected to the main terminals 15—15', while the micro-contacts 16—16' are lodged in the depressions 17—17' in a way so that they resemble that of the micro-contacts 4—4' lodged in depressions 5—5' of FIG. 1. The process sequence is similar; as soon as the material of the saddle and the tube attains the desired fusion, it penetrates into the depressions 17—17' and operates the micro-switches 16—16' thus cutting-off the power applied to coil 14 and thus ending the welding process.

FIG. 3 illustrates very schematically electrical circuitry of the embodiment shown in FIG. 1 as it has been described. From a low voltage source 20, conductors 21-22 are wired to the main terminals 6—6' of the welding coil. On conductor 22 a control system comprises a relay 23 connected by leads 24 and 25 with the micro-switches 4—4' in depression 5—5'. The power supply lines 21-22 are shown in heavy lines while the control leads 24-25 are shown in lighter lines. The start-up is controlled manually and the shut-off is accomplished by the micro-contacts 4—4' as described above. The manual control is by push-button 24. Sensors 4—4' reacting to the pressure of the material in fusion in the holes 5—5' made in the sleeve 1 control the shut-off.

According to the variations within the framework of the invention, these sensors can also be sensible to temperature, and the control circuit can be commanded using only the temperature, or only by the volume of the material, or since there are two holes in each sleeve, using temperature on one side and the volume on the other.

The electrical circuit for the embodiment of FIG. 2 is the same as that for FIG. 1, the power supply lines 21 and 22 being connected with terminals 15—15' of the resistance coil 14 and the control lines 24-25 being connected to micro-switches 16—16' in depressions 17—17'.

Note on FIGS. 1 and 2 are the reference to the zones signated "f" and "s" on the sleeve 1 and the saddle 10. The zones "s" are the welding zones and the zones "f" are the cold zones, which stop the material in fusion from escaping laterally, which would hinder the pressure build-up.

Figure 4:
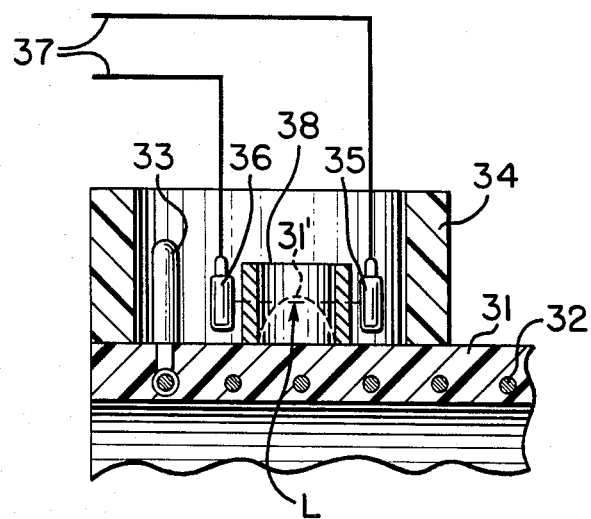
FIG. 4 illustrates schematically a further embodiment of the invention, and FIG. 5 illustratres schematically a variant of the embodiment illustrated in FIG. 4.
Figure 5:
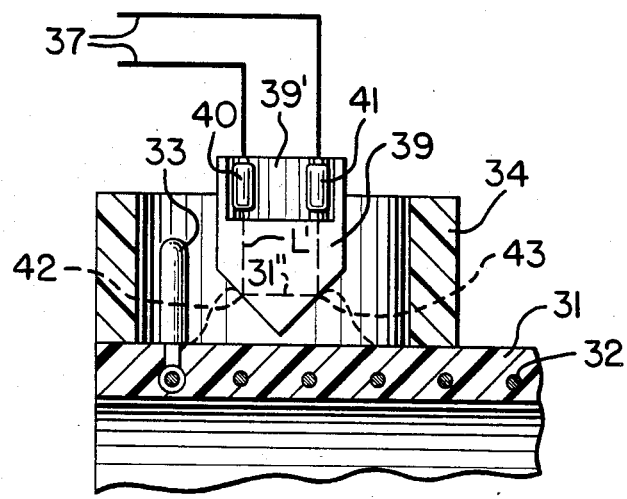

FIGS. 4 and 5 partially show a thermo-plastic element 31 to be welded to another thermo-plastic element (not shown). In the thermo-plastic element 31 there is imbedded an electrical resistance heating coil 32 provided with a terminal connecting pin 33 located in a socket 34 and a second like connecting pin which is not shown. The heating coil 32 is energized from an electric circuit such as that shown in FIG. 3 to which it is connected by the two terminal pins such as 33. The supply of electric energy to the coil 32 is controlled by electronic means connected to wires 37.

In the embodiment illustrated in FIG. 4, the ends of the wires 37 are connected to the two parts 35 and 36 of an optical system disposed in a hole 38 in which the material of the element 31 can expand when it is softened by heating by the coil 32. The part 35 emits a light beam L which is received by the part 36 when the hole is empty. The signal sent by the wires 37 indicates "absence of material in hole 38".

When the material of the element 31 is heated by the coil 32 it expands into the hole 38 as indicated at 31'. As soon as the light beam l is cut by the expanding material, the signal sent by the wires 37 is inversed and indicates "presence of material in hole 38". The electronic circuit thereupon cuts off the current supply to the coil 32 and the welding operation is completed upon cooling of the welded elements.

In the modification shown in FIG. 5, a total-reflection prism 39 is placed in the socket 34 which serves also as the hole 38 of FIG. 4. Parts 40 and 41 of an optical system similar to parts 35 and 36 are placed into a recess 39' of the prism 39.

When the material of the element 31 has not yet expanded into the socket 34, the light beam L' emitted by part 40 of the optical system strikes the first inclined face of the prism at 42 where it is totally reflected and then stirkes the second inclined face at 43 where it is totally reflected for a second time and therefore reaches the element 41. The signal thereupon supplied to the leads 37 of the electronic circuit indicates "absence of material in socket 34".

When the expanded material of the element 31 reaches the point 42 and/or 43 as indicated at 41'', then the coresponding face of the prism 39 is no longer totally reflecting since the refractive index between the internal and external faces has changed. The light beam L' is thereby interrupted and the signal supplied to the leads 37 indicates presence of material. Such signal controls the cutting off of current supply to the coil 32.

The optical sensors 35, 36, 40 and 41 are commercially available elements. Moreover, the output signal from the sensors is electronically processed in well known manner to give a binary signal which controls the current cut-off.

As in the embodiments illustrated in FIGS. 1 and 2, the energizing of the heating coil 32 is effected manually while the termination of heating is controlled automatically by the signal transmitted through leads 37.

Through control of the heating current in the manner described, the current is cut-off when the temperature of the thermo-plastic material hs reached an optimum temperature for effecting a high quality weld.

What I claim is:

1. A process of uniting by welding two members a thermo-plastic insulating material which comprises bringing the two members together with contiguous surfaces in a zone to be welded, providing a resistive electrical current path in said members in an inner weld zone adjacent said contiguous surfaces, passing electrical current through said electrical current path to heat the material of said members to welding temperature in said inner weld zone only while leaving enveloping outer portions of said members at lower temperature, providing in one of said members a space into which said material heated to welding temperature can expand, providing means for sensing the expansion of said material heated to welding temperature into said space and means controlled by said sensing means for cutting off supply of electrical current to said current path when predetermined welding temperature is reached.

2. A process according to claim 1, in which said sensing means comprises a pressure sensitive element positioned in a depression in an outer portion of one of said members.

3. A process according to claim 1, in which said sensing means comprises means for electro-optically sensing expansion into said space of material heated to welding temperature.

4. A process according to claim 3, in which said sensing means comprises a light transmitting element and a light receiving element disposed respectively at opposite sides of said space.

5. A process according to claim 3, in which said sensing means comprises a prism inserted into said space and optical sensing elements in a recess in said prism.

* * * * *